United States Patent [19]

Metz

[11] 4,051,728

[45] Oct. 4, 1977

[54] INSTRUMENT FOR MONITORING PHYSICAL PARAMETERS OF TEMPERATURE AND PRESSURE

[76] Inventor: Walter Metz, Hohenweg 2-6, Moosbrunn, Germany, 6936

[21] Appl. No.: 632,694

[22] Filed: Nov. 17, 1975

[30] Foreign Application Priority Data

Nov. 18, 1974    Germany ............................ 2454658

[51] Int. Cl.² .................... G01K 1/02; G01L 19/12
[52] U.S. Cl. ........................... 73/343 R; 73/389; 73/410; 73/432 A; 116/129 R; 340/266
[58] Field of Search .................. 73/410, 432 A, 368, 73/368.7, 343 R, 389; 340/259, 266, 62; 116/129

[56] References Cited

U.S. PATENT DOCUMENTS

| 2,162,308 | 6/1939 | Jenny ...................................... 73/410 |
| 2,430,413 | 11/1947 | Schulz ..................................... 73/410 |
| 2,744,489 | 5/1956 | Gallant ..................................... 73/410 |
| 2,804,041 | 8/1957 | Neugass .............................. 116/129 R |
| 3,633,200 | 1/1972 | Ellison ................................. 73/432 A |
| 3,635,306 | 1/1972 | Davis ....................................... 340/62 |
| 3,656,451 | 4/1972 | Raznor ................................... 73/410 |

FOREIGN PATENT DOCUMENTS 308,577    3/1918    Germany ............................ 340/266

Primary Examiner—S. Clement Swisher
Attorney, Agent, or Firm—Herbert L. Lerner

[57] ABSTRACT

An instrument for monitoring a physical parameter consisting of temperature or pressure, includes an elastic sensor displaceable as a function of the physical parameter being monitored, a belt extending over at least two spaced rollers and coupled to the elastic sensor in such a manner as to be displaced by an amount proportional to the displacement of the elastic sensor, the belt having a characteristic which changes along the length thereof, and sensing means responsive to the characteristic of the belt for producing an output signal which varies as a predetermined function of the physical parameter being monitored.

21 Claims, 6 Drawing Figures

INSTRUMENT FOR MONITORING PHYSICAL PARAMETERS OF TEMPERATURE AND PRESSURE

The invention relates to an instrument for monitoring temperature or pressure, including alarm instruments for indicating when predetermined pressures or temperatures are exceeded.

Instruments are known in which the deflection of an elastic sensor, such as a Bourdon tube, is transmitted by a lever mechanism to a pointer located in front of a calibrated scale. When it is important that the scale of such an instrument should have linear graduations and should not be arcuately curved but should lie in a flat plane in accordance with the so-called shelf technique, a considerable expense in construction must be incurred which not only makes the instrument costly, complicated and prone to malfunction, but also leads to the introduction of frictional losses tending to falsify the measurement.

Instruments are also known in which sensors respond to displacement of the pointer to provide a control signal. In such instruments equipped with inductive sensors in the form of an induction coil having an air gap and with a scale over which the pointer is movable, it is customary to accompany the pointer on the scale with a maximum pointer on which is fixed an aluminum lug and which, when a certain point is reached on the scale, enters the air gap of the induction coil thus changing the field strength in the coil and producing a control signal. It is peremptorily necessary that the aluminum lug connected to the maximum pointer should remain in the air gap of the induction coil even if the pointer of the indicating device moves past the preset point on the scale. This is achieved in the heretofore known instruments by a stop pin against which the maximum pointer is urged when the aluminum lug enters the air gap of the inductive sensor. However, this enforced stopping of the maximum pointer exerts reactive forces on the measurement system which leads to additional hysteresis in the measurement.

It is accordingly an object of the invention to provide an instrument for monitorying a physical parameter consisting of temperature or pressure which avoids the foregoing disadvantages of the heretofore known instruments of this general type.

With the foregoing and other objects in view, there is provided, in accordance with the invention, an instrument for monitoring a physical parameter consisting of temperature or pressure comprising an elastic sensor displaceable as a function of the physical parameter being monitored, a belt extending over at least two spaced rollers and coupled to the elastic sensor in such a manner as to be displaced by an amount proportional to the displacement of the elastic sensor, the belt having a characteristic which changes along the length thereof, and sensing means responsive to the characteristic of the belt for producing an output signal which varies as a predetermined function of the physical parameter being monitored.

In accordance with another feature of the invention, the instrument includes a lever arm pivotable at one end thereof about a fixed point and connected at the other end thereof to the belt, the lever arm being connected at a point along the length thereof to the elastic sensor.

In accordance with a further feature of the invention, the instrument includes a rack coupled to the elastic sensor and cooperating with a pinion connected to one of the rollers to displace the belt by an amount corresponding to the displacement of the elastic sensor.

In accordance with an added feature of the invention, the belt is an endless belt.

In accordance with an additional feature of the invention, the instrument includes a torsion spring connected to at least one of the rollers for pre-tensioning the same.

In accordance with a supplemental feature of the invention, one of the rollers is formed with teeth at the periphery thereof, the belt being formed with perforations meshing with the teeth.

In accordance with an accessory feature of the invention, the sensing means is displaceable relative to the run of the belt between the rollers.

In accordance with an auxiliary feature of the invention, a plurality of the sensing means are displaceable independently of one another.

In accordance with a concomitant feature of the invention, the sensing means include an induction coil formed with an air gap through which at least a portion of the belt passes, the chacteristic of the belt being a property selected from the group consisting of para- or ferro- magnetic properties varying along the length of the belt.

In accordance with a supplementary feature of the invention, the belt is formed of a flexible and tear-resistant base material having a linear coefficient of thermal expansion approximating zero and carrying magnetic material having the property.

In accordance with a contributory feature of the invention, the belt is formed of synthetic material on which a band of ferromagnetic particles is applied.

In accordance with an accompanying feature of the invention, the magnetization of the particles is amplitude or frequency-modulated in longitudinal direction of the belt in accordance with the predetermined function of the physical parameter being monitored.

In accordance with an extra feature of the invention, the sensing means includes a plurality of inductive sensors, and a plurality of the bands is applied to the belt, each of the bands being associated with a respective inductive sensor.

In accordance with an appended feature of the invention, the sensing means comprise a reed relay and the belt carries at least one band of ferromagnetic material for operating the reed relay.

In accordance with yet another feature of the invention, the sensing means comprise a light source and a light-sensitive element disposed in a beam of the light source, and the characteristic of the belt is a property selected from the group consisting of transparency or reflectivity properties of the belt.

In accordance with yet a further feature of the invention, the transparency property of the belt is modulated in longitudinal direction of the belt in accordance with the predetermined function of the physical parameter being monitored.

In accordance with yet an added feature of the invention, the sensing means comprises a plurality of the light sources and light-sensitive elements, and a plurality of bands having the property in varying strength are provided on the belt, each of the bands being associated with a respective light source and light-sensitive element.

In accordance with another feature of the invention, the sensing means comprise an air nozzle, and the belt is formed with a slot running in longitudinal direction thereof so that an air current from the air nozzle can pass therethrough.

In accordance with a further feature of the invention, the slot commences at a null point of the belt.

In accordance with an additional feature of the invention, the sensing means include a stationary light source, the light from which is focused on light-sensitive diodes carried by the belt, the focused light being uncoverable proportionately to displacement of the elastic sensor by means of a flap connected to the elastic sensor.

In accordance with a supplemental feature of the invention, the belt in a region thereof which, in undeflected state lies before a null point, is provided with only narrow edge bands and a punched out middle band, and, in a region between the null point and a full scale deflection point, has a plurality of varying characteristics so as to be capable of operating with any one of a variety of sensing means.

In accordance with another feature of the invention, the belt is insertable as a cassette into the monitoring instrument.

In accordance with a further feature of the invention, a marker is disposed on the belt and, in conjunction with a fixed scale, serves to indicate the physical parameter that is measured.

In accordance with an added feature of the invention, a scale is printed on the belt, the scale in conjunction with a read-off window located in front of the belt, forming a digital display.

In accordance with an additional feature of the invention, the sensing means comprise a bellows of copper beryllium.

With such an arrangement, a chosen characteristic of the belt, for example the magnetization, transparency, reflectivity, or porosity may be modulated along the length of the belt so that as the belt moves past the sensing means any desired control signal may be produced without the necessity of halting movement of the belt or introducing extraneous forces.

The invention will now be described further, by way of example, with reference to accompanying drawings, in which.

Figure 1:
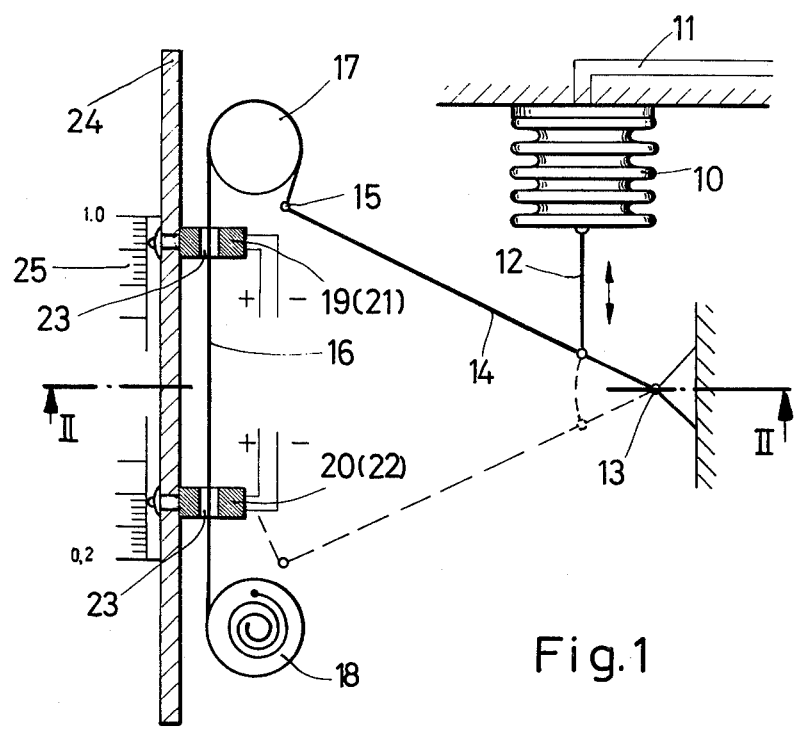
FIG. 1 is a diagrammatic vertical sectional view of the measurement and display system of a pressure monitoring instrument according to the invention.
Figure 2:
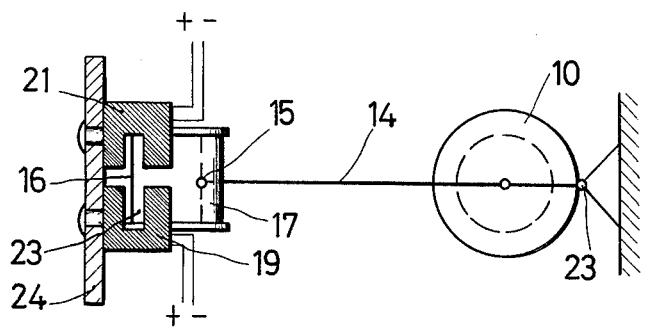
FIG. 2 is a horizontal sectional view of FIG. 1 taken along the line II—II in the direction of the arrows.

Referring now to the drawing and first, particularly to FIGS. 1 and 2 thereof, there is shown a pressure monitoring instrument provided with an elastic sensor in the form of a bellows 10 of of copper beryllium operatively connected to a pressure measurement conduit 11. The bellows 10 is connected by means of a rod 12 to a lever arm 14 pivoted about a pivot point 13, the free end of the lever arm 14 being connected to the end 15 of a belt 16, which runs over two spaced rollers 17 and 18. One end of the belt 16 is secured to the roller 18, which is pre-tensioned by a torsion spring, and the other end of the belt 16 passes over the roller 17. The belt 16 follows a straight vertical path in the region between the rollers 17 and 18, wherein sensors 19 to 22, operable by the belt 16 for a controlling and/or signalling device, are disposed. In the view of FIG. 1 only the sensors 19 and 20 can be seen, and in the view of FIG. 2 only the switching sensors 19 and 21.

In the embodiment of FIGS. 1 and 2, the sensors 19 to 22 are inductive sensors, each including an induction coil, the belt 16 passing through an air gap 23 in each sensor. The sensors 19 to 22 are fixed to a front panel 24 by means clamping screws and are individually displaceable over the full range of a scale 25.

FIG. 1 shows the measuring system in the undisplaced state of the belt 16. Here a marker on the belt 16 is located at the lower end of the scale 25. The position of the lever arm 14 at full scale deflection is shown in dotted lines; in this case the marker on the belt 16 would have shifted to the upper part of the scale.

The part of belt 16 which, during full scale deflection, extends parallel to the scale, includes a portion having para- or ferromagnetic properties and which therefore, on entry into an air gap 23 of one of the inductive sensors 19 to 22, alters the field strength in the air gap and thereby triggers a signal or control operation.

Preferably the belt 16 consists of a flexible base material of adequate tensile strength with a linear coefficient of thermal expansion that is substantially zero. If a layer of ferromagnetic particles is applied to the belt, it is possible to modulate the magnetization of this layer in the longitudinal direction of the belt according to a predetermined control curve, using either amplitude or frequency modulation. If different control tasks are to be triggered by the pairs of sensors 19, 20 or 21, 22, each pair of sensors is provided with a separate band of magnetizable particles.

It the measuring system is also to serve as a display system for pressure, the marker, for example in the form of an arrow, is printed on the vertically extending run of the belt 16, and moves up and down the scale to enable the measured value to be read off. The scale is linear, because, in the region of measurement, the bellows 10 expands in strict linear proportion to the pressure inside the bellows, and its movement, transmitted to the belt 16 by the lever arm 14, also results in a linear movement of the belt 16. The scale 25 can be in a flat plane as the movement of the belt 16 in the forward vertical run proceeds strictly in a straight line.

Figure 3:
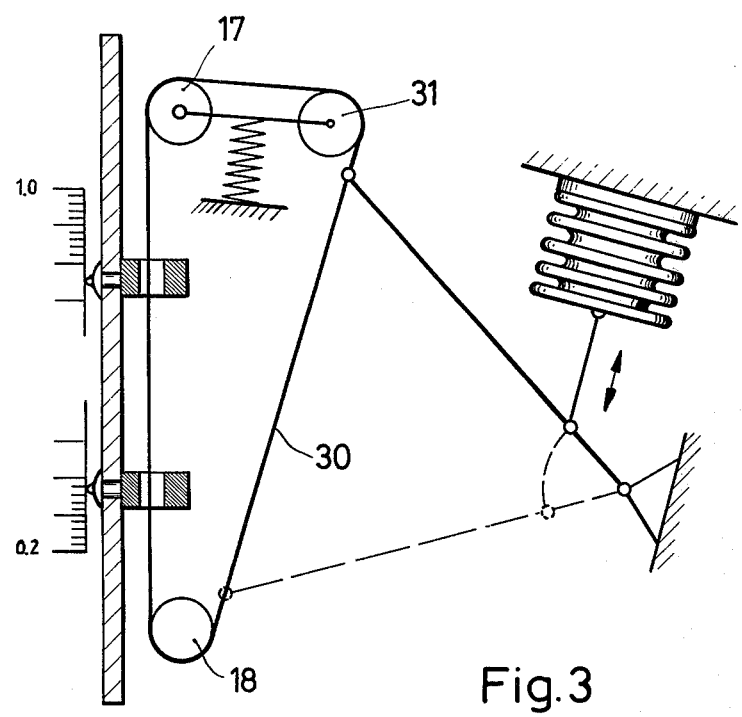
FIG. 3 is a diagrammatic vertical sectional view of another embodiment of the measurement and display system of the pressure monitoring instrument according to the invention.
Figure 4:
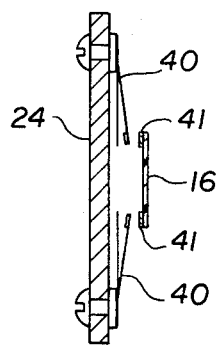
FIGS. 4, 5 and 6 are views similar to those of FIG. 2 showing other embodiments of the invention.

The embodiment of FIG. 3 is distinguished from the first embodiment only in that the belt is formed as an endless belt 30 and additionally runs over a third roller 11, having an axis that is resiliently connected to the axis of the roller 17, so that the belt 30 is under tension in every position of the measuring system.

In both illustrated embodiments of the invention, the inductive sensors 19 to 22 can be replaced by other sensors. In this respect, reed relays, capacitative sensors, air nozzles operating by an air flow interruption method, or light sources in cooperation with light-sensitive elements are available. In each case, the belt 16 or 30 is so constructed that it provides a changing characteristic to which the sensor is sensitive. In the case of a reed relay, such as the reed relay 40 in FIG. 6, it should therefore carry a ferromagnetic material, such as the bands 41 thereof, by means of which the reed relay 40 can be activated, and also remain activated, if the measuring system shifts past the selected point at which the switch-over is to take place.

Figure 5:
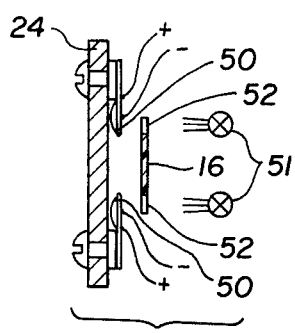

If, as in FIG. 5, a light source 51 with a light-sensitive element 50 disposed in the beam of the light source 51 is provided as sensor, the belt 16 or 30 undergoes a change in transparency or reflectivity at the selected point 52 where switch-over is to take place. In this case also, the tranparency or reflectivity in the longitudinal direction of the belt can be so varied that the light-sensitive element produces a signal which varies as a predetermined function of pressure. If several optical sensing systems are disposed adjacent each other and are independently movable with respect to each other, each system can be provided with a respective band on the belt.

Figure 6:
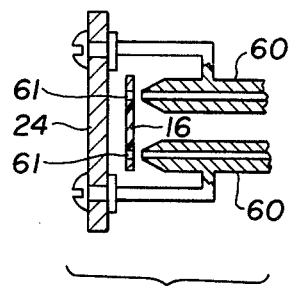

If, as in FIG. 6, an air nozzle operated by an air flow interruption method is provided, slots 61 are then formed, extending in longitudinal direction of the belt, through which an air stream of the air nozzle can pass when the sensor is to be activated.

All these sensing arrangements require no further explanation and illustration, as their construction and arrangement in conjunction with a monitoring instrument and/or alarm in accordance with the invention is evident.

A particularly advantageous form of the belt is obtained if the belt has narrow edge bands and a punched-out middle band and if it is operable as a switching device for all types of sensors which can be selectively employed. The middle band of the belt is so formed that, depending on the choice of sensors, it can switch on an inductive sensor, or a capacitative sensor, or a light-sensitive sensing arrangement, or an air nozzle arrangement, or a proximity switch, or a reed relay. Such a belt covers virtually all practical applications, so that the instrument is universally applicable.

It will be appreciated that if the bellows 10 is sealed instead of being connected to the conduit 11, the pressure in the bellows will depend on the temperature of the bellows so that the same instrument can, with minor modification, serve for temperature measurement in accordance with the invention.

While a lever mechanism has been described for connecting the bellows 10 to the belt, it would be alternatively possible to employ a rack coupled to the bellows and cooperating with a pinion fixed to the roller 17. To prevent the belt from slipping relative to the roller 17, the latter may be provided with teeth engaging in apertures formed in the belt, in a manner analogous to a film strip passing over a toothed sprocket in a film projector.

In a further alternative embodiment, the sensing means may include a stationary light source fixed to the inside of the rear wall of the instrument casing, a beam from that light source being focused on light-sensitive diodes provided on the belt, the light beam being capable of being uncovered proportionally to the displacement of the bellows by means of a flap connected to the bellows.

It is also envisaged in accordance with the invention that the belt may be insertable as a cassette into the monitoring instrument.

The instrument may furthermore be constructed to provide a digital or analog display. For example, the belt may have a pointer or a colored strip to give a meter or a thermometer-type display. Alternatively, the belt may be movable past a small window through which is printed scale on the belt may be read, thereby providing a digital display.

There is claimed:

1. An instrument for monitoring a physical parameter consisting of temperature or pressure, comprising an elastic sensor displaceable as a function of the physical parameter being monitored, a belt extending over at least two spaced rollers and coupled to the elastic sensor in such manner as to be displaced by an amount proportional to the displacement of the elastic sensor, said belt having a characteristic which changes along the length thereof, and sensing means responsive to said characteristic of said belt for producing an output signal which varies as a predetermined function of the physical parameter being monitored, said belt also having means for indicating the measured value of the physical parameter that is monitored.

2. An instrument as claimed in claim 1, including a lever arm pivotable at one end thereof about a fixed point and connected at the other end thereof to said belt, said lever arm being connected at a point along the length thereof to said elastic sensor.

3. An instrument as claimed in claim 1 wherein said belt is an endless belt.

4. An instrument as claimed in claim 1, including a torsion spring connected to at least one of said rollers for pre-tensioning the same.

5. An instrument as claimed in claim 1, wherein said sensing means is displaceable relative to the run of the belt between said rollers.

6. An instrument for monitoring a physical parameter consisting of temperature or pressure, comprising an elastic sensor displaceable as a function of the physical parameter being monitored, a belt extending over at least two spaced rollers and coupled to the elastic sensor in such a manner as to be displaced by an amount proportional to the displacement of the elastic sensor, said belt having a characteristic which changes along the length thereof, and sensing means responsive to said characteristic of said belt for producing an output signal which varies as a predetermined function of the physical parameter being monitored, said sensing means including a plurality of sensors displaceable independently of one another.

7. An instrument for monitoring a physical parameter consisting of temperature or pressure, comprising an elastic sensor displaceable as a function of the physical parameter being monitored, a belt extending over at least two spaced rollers and coupled to the elastic sensor in such a manner as to be displaced by an amount proportional to the displacement of the elastic sensor, said belt having a characteristic which changes along the length thereof, and sensing means responsive to said characteristic of said belt for producing an output signal which varies as a predetermined function of the physical parameter being monitored, said sensing means including an induction coil formed with an air gap through which at least a portion of said belt passes, said characteristic of said belt being a property selected from the group consisting of para- or ferro- magnetic properties varying along the length of said belt.

8. An instrument as claimed in claim 7, wherein said belt is formed of a flexible and tear-resistant base material having a linear coefficient of thermal expansion approximating zero and carrying magnetic material having said property.

9. An instrument as claimed in claim 7, wherein said belt is formed of synthetic material on which a band of ferromagnetic particles is applied.

10. An instrument as claimed in claim 9, wherein the magnetization of said particles is amplitude or frequency-modulated in longitudinal direction of said belt in accordance with said predetermined function of the physical parameter being monitored.

11. An instrument as claimed in claim 10, wherein said sensing means includes a plurality of inductive sensors, and wherein a plurality of said bands is applied to said belt, each associated with a respective inductive sensor.

12. An instrument as claimed in claim 1, wherein said sensing means comprise a reed relay and wherein said belt carries at least one band of ferromagnetic material for operating said reed relay.

13. An instrument as claimed in claim 1, wherein said sensing means comprise a light source and a light-sensitive element disposed in a beam of said light source and wherein said characteristic of said belt is a property selected from the group consisting of transparency or reflectivity properties of said belt.

14. An instrument as claimed in claim 13, wherein said transparency property of said belt is modulated in longitudinal direction of said belt in accordance with said predetermined function of the physical parameter being monitored.

15. An instrument as claimed in claim 13, wherein said sensing means comprises a plurality of said light sources and said lightsensitive elements, and wherein a plurality of bands having said property in varying strength are provided on said belt, each of said bands being associated with a respective light source and light-sensitive element.

16. An instrument as claimed in claim 1, wherein said sensing means comprise an air nozzle, and wherein said belt is formed with a slot running in longitudinal direction thereof so that an air current from said air nozzle can pass therethrough.

17. An instrument as claimed in claim 16, wherein said slot commences at a null point of said belt.

18. An instrument as claimed in claim 7, wherein said belt in a region thereof which, in undeflected state lies before a null point, is provided with only narrow edge bands and a punched out middle band, and wherein, in a region between said null point and a full scale deflection point, has a plurality of varying characteristics so as to be capable of operating with any one of a variety of sensing means.

19. An instrument for monitoring a physical parameter consisting of temperature or pressure, comprising an elastic sensor displaceable as a function of the physical parameter being monitored, a belt extending over at least two spaced rollers and coupled to the elastic sensor in such a manner as to be displaced by an amount proportional to the displacement of the elastic sensor, said belt having a characteristic which changes along the length thereof, and sensing means responsive to said characteristic of said belt for producing an output signal which varies as a predetermined function of the physical parameter being monitored, and including a marker disposed on said belt and, in conjunction with a fixed scale, serving to indicate the physical parameter that is measured.

20. An instrument for monitoring a physical parameter consisting of temperature or pressure, comprising an elastic sensor displaceable as a function of the physical parameter being monitored, a belt extending over at least two spaced rollers and coupled to the elastic sensor in such a manner as to be disposed by an amount proportional to the displacement of the elastic sensor, said belt having a characteristic which changes along the length thereof, and sensing means responsive to said characteristic of said belt for producing an output signal which varies as a predetermined function of the physical parameter being monitored, and including a scale printed on said belt, said scale, in conjunction with a read-off window located in front of said belt, forming a digital display.

21. An instrument as claimed in claim 1, wherein said sensing means comprise a bellows of copper beryllium.

* * * * *